United States Patent [19]
Rusconi et al.

[11] Patent Number: 5,454,995
[45] Date of Patent: Oct. 3, 1995

[54] METHOD FOR REDUCING CYCLE TIME IN AN INJECTION MOLDING MACHINE

[75] Inventors: Michael A. Rusconi, Cincinnati; William A. Reinhart, Georgetown, both of Ohio

[73] Assignee: Cincinnati Milacron, Inc., Cincinnati, Ohio

[21] Appl. No.: 229,476

[22] Filed: Apr. 18, 1994

[51] Int. Cl.$^6$ ............................. B29C 45/54; B29C 45/18
[52] U.S. Cl. ................................. 264/328.8; 264/328.19; 425/557, 559, 562
[58] Field of Search ............................. 264/297.2, 328.1, 264/328.8, 328.13, 328.19; 425/557, 559, 560, 562, 567, 573, 205, 207

[56] References Cited

U.S. PATENT DOCUMENTS

| | | | |
|---|---|---|---|
| 3,296,353 | 1/1967 | Nouel | 264/328.8 |
| 3,417,433 | 12/1968 | Teraoka | 264/328.8 |
| 3,861,841 | 1/1975 | Hanning | 425/146 |
| 3,940,223 | 2/1976 | Farrell . | |
| 3,945,784 | 3/1976 | Collins | 425/130 |
| 4,734,243 | 3/1988 | Kohama et al. | 264/328.8 |
| 5,281,384 | 1/1994 | Banks | 264/297.2 |

*Primary Examiner*—Jill L. Heitbrink
*Attorney, Agent, or Firm*—Stephen H. Friskney

[57] ABSTRACT

The method of the present invention relates to reducing cycle time in injection molding machines that are running large capacity molds, such as multiple cavity preform molds, and require a high volume supply of quality melt. Specifically, the present invention proposes using a continually plasticizing extruder to supply two melt accumulators which will alternately operate to inject the plastic material into the mold. To accomplish this, a rotary valve at the end of the extruder is controlled to fill the pots, and ball check valves are positioned to control flow direction and limit pressure in certain parts of the system. A shuttle valve between the shot pots and before the nozzle facilitates decompression.

2 Claims, 4 Drawing Sheets

5,454,995

METHOD FOR REDUCING CYCLE TIME IN AN INJECTION MOLDING MACHINE

FIELD OF THE INVENTION

The present invention relates to a method of reducing the cycle time in an injection molding machine and more particularly to a method involving operation of two melt accumulators that are supplied by a continuously operating extruder.

DESCRIPTION OF THE RELATED ARTS

With a standard reciprocating screw injection molding machine, material is melted on the screw as the screw rotates and retracts in the barrel to accumulate a quantity of melt in front of the screw. When a sufficient amount of material is accumulated ("a shot"), the screw is moved rapidly forward (without rotation) to inject the melt straight into the mold. Plasticizing of the material must occur during the cooling and clamp/eject portions of the cycle since the screw cannot plasticize during fill, pack, and hold (see FIGS. 1 and 2a). This means that in order to plasticize the same amount of material in the same cycle time, the plastic must be melted in less time. The result is higher screw speeds which leads to higher melt temperature. Higher melt temperature can mean longer time required to cool as well as higher acid aldehyde (AA) levels and other adverse melt effects. Furthermore, since the screw retracts during plasticizing, the processing L/D changes causing temperature gradients in the accumulated shot.

A single melt accumulator, reciprocating screw injection molding machine plasticizes the material on the screw in the same manner as the standard machine and then injects(transfers) the material into the accumulator. The accumulator then injects the melted material into the mold. This allows the screw to plasticize during the fill, pack and cool/hold portions of the cycle, since they are now performed by the accumulator (see FIG. 2b). The only time the screw is not plasticizing is when it transfers into the accumulator. This is an improvement over the standard machine since it allows for longer hold time and additional plasticizing time. Longer hold time allows for better cooling of the part while pressure is held on the part to stop it from shrinking away from the mold surface. Additional plasticizing time overcomes some of the disadvantages noted earlier. However, it would be a further improvement to avoid the interruption of plasticizing that when the screw is used to inject the plastic melt into .the accumulator.

The prior art has also proposed the simultaneous use of two standard, reciprocating screw injection units to allow consistent processing of material where large capacity molds with relatively short cycles are involved. This approach allows one or the other of the injection units to be plasticizing material at any point in time, in effect providing continuous plasticizing. While providing a significant improvement in processing time as compared to a single unit, the use of two injection units doubles the cost of this part of the machine since every component is duplicated. Furthermore, some of the disadvantages associated with processing material by a reciprocating screw, such as a variation in L/D during plasticizing, are still present. Accordingly, a lower cost, equivalent process would be the most desirable solution.

SUMMARY OF THE INVENTION

An object of the present invention is to provide a method of efficiently supplying quality melt to a large capacity mold. This is accomplished through a dual accumulator arrangement in combination with a non-reciprocating screw extruder to allow for quicker cycle times while increasing plasticizing time to improve melt and part quality.

A comparison of the charts given in FIGS. 2a through 2c shows the differences between the present invention and prior art systems. The sequence to injection mold virtually any thermoplastic part is basically the same. There is fill, pack, hold, cool and eject. Obviously, the material must be plasticized before filling can occur; the most efficient way to accomplish this is to have the plasticizing of the material be independent of the molding of the parts. This allows the molder to optimize the plasticizing of the material as well as the conditions relating to molding of the part.

The dual accumulator, non-reciprocating screw design of the present invention plasticizes material on a fixed extruder and directs the plastic melt to the accumulator that is not actively involved in the molding function ("the shot-building accumulator"). While that accumulator is filling, the other melt accumulator ("the injection accumulator") is operating to fill, pack and hold pressure on the mold. When the molding operation is finished, the injection accumulator is inactive for a short period while the clamp operates. By this time the shot-building accumulator has received a full charge of plastic melt and a rotary valve on the extruder shifts to divert the flow of melt to begin building a shot in the empty accumulator. The accumulators thus alternate so that one receives material while the other operates, allowing continuous plasticizing by the extruder.

This design allows for continuous extrusion of the plastic over a fixed L/D screw without interruption, as opposed to the variable L/D and reciprocating action of the typical injection unit. The entire cycle time can be used to build the needed shot of plastic melt. The melt accumulators are free to fill, pack and hold the material in the mold until the parts are ready to be ejected. In addition, there is no need to relieve pressure for material transfer from the screw.

Accordingly, the present invention provides an extremely efficient method for molding parts, especially those involving a large volume of material. It allows for better use of the screw and provides more consistent results. It can reduce RPM on the screw which can reduce AA and melt temperature. Full pressure can be maintained on the mold for almost the entire cycle, providing an opportunity for more efficient cooling and better packing for thick parts.

DESCRIPTION OF THE PREFERRED EMBODIMENTS

The present invention involves a specific method of injection molding; as such, it will be described in connection with a particular type of injection molding machine. Since the general structure and operation of injection molding machines is well known, those aspects of the apparatus which are different or take on a new use with respect to the method will receive primary emphasis.

Figure 4:
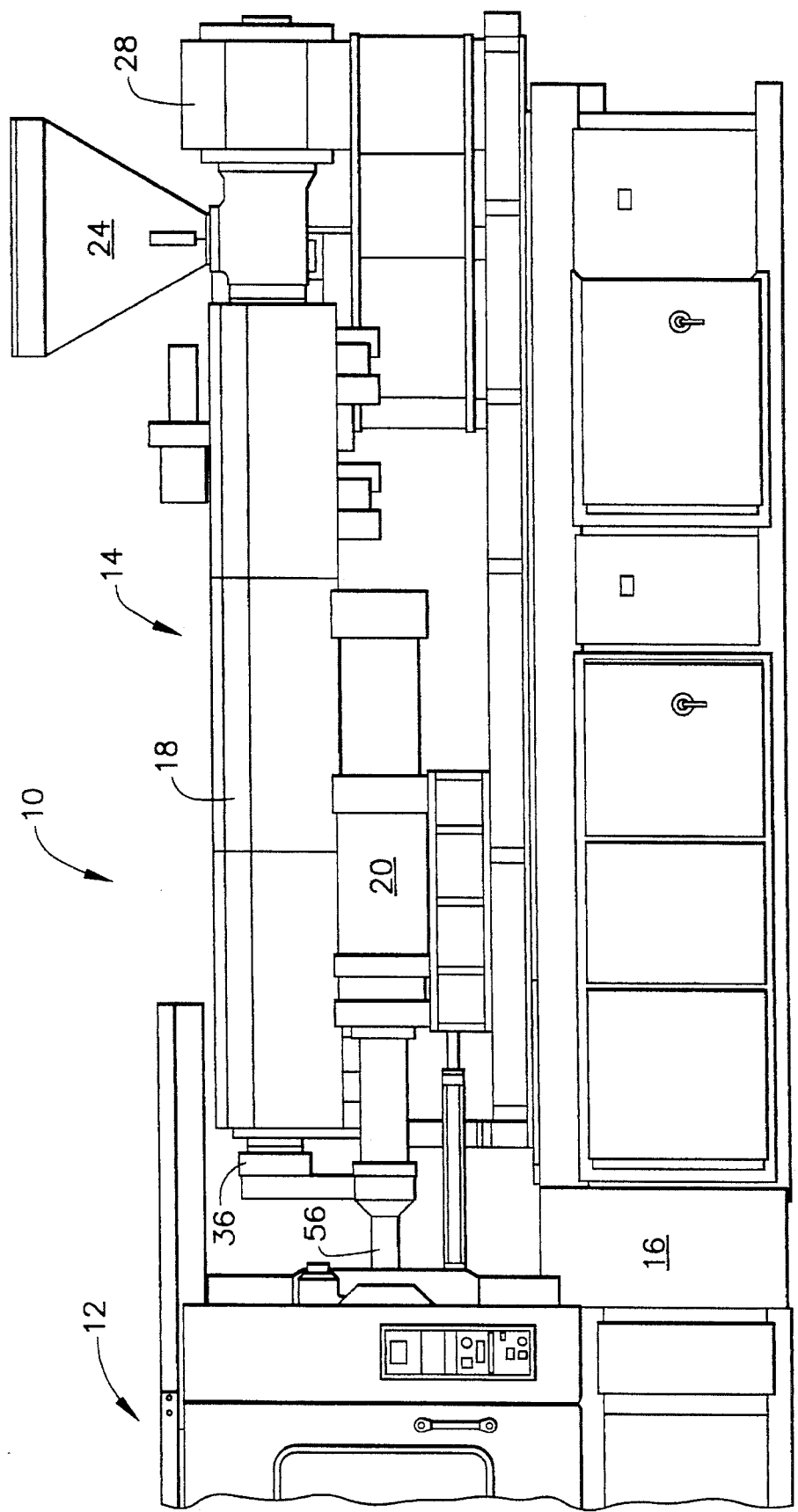
FIG. 4 is a front elevational view of an injection molding machine that includes apparatus to perform the method of the present invention.
Figure 5:
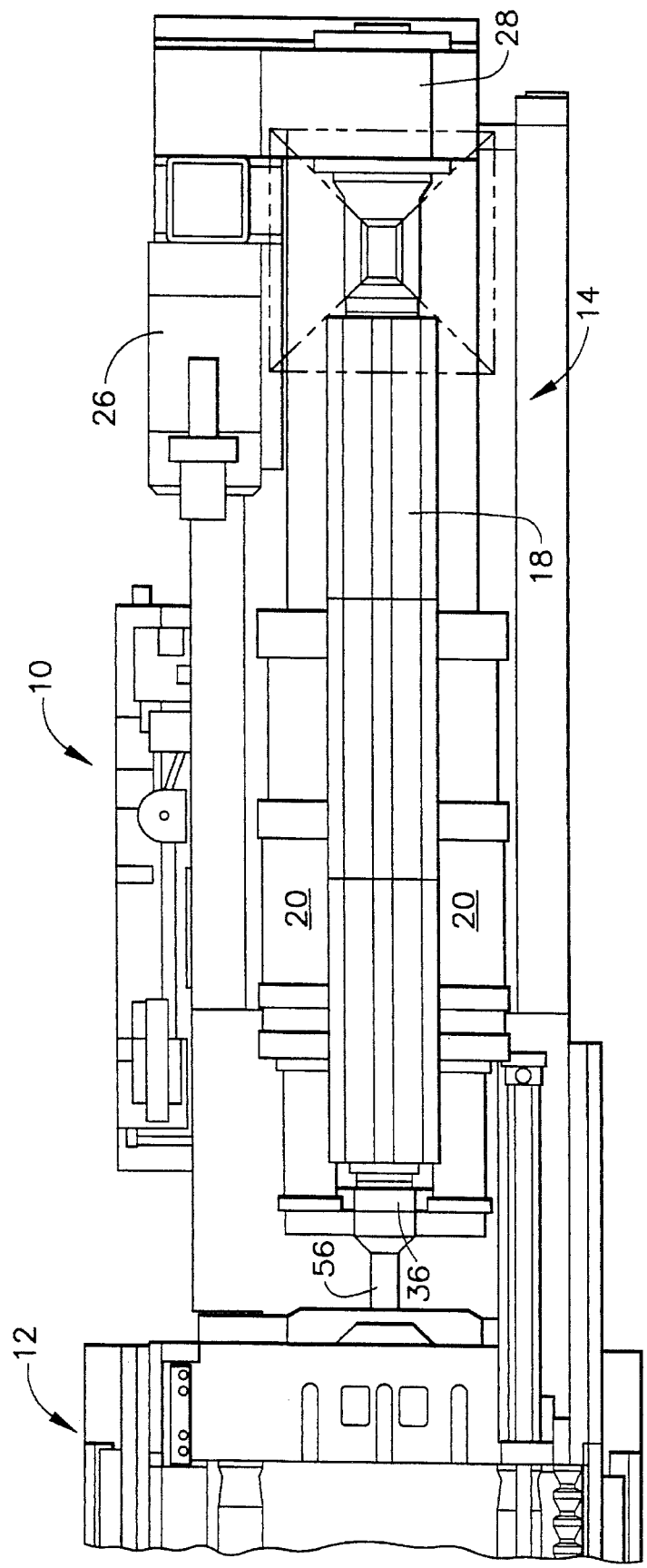
FIG. 5 is a top plan view of the injection molding machine shown in FIG. 4.

Preferably, the method of the present invention is applied to an injection molding machine 10, as shown in FIGS. 4 and 5. The general configuration of the molding machine 10 is typical, including a conventional clamp unit 12, and a specially designed injection unit 14, both of which are mounted on an elongated support or base 16.

Figure 3:
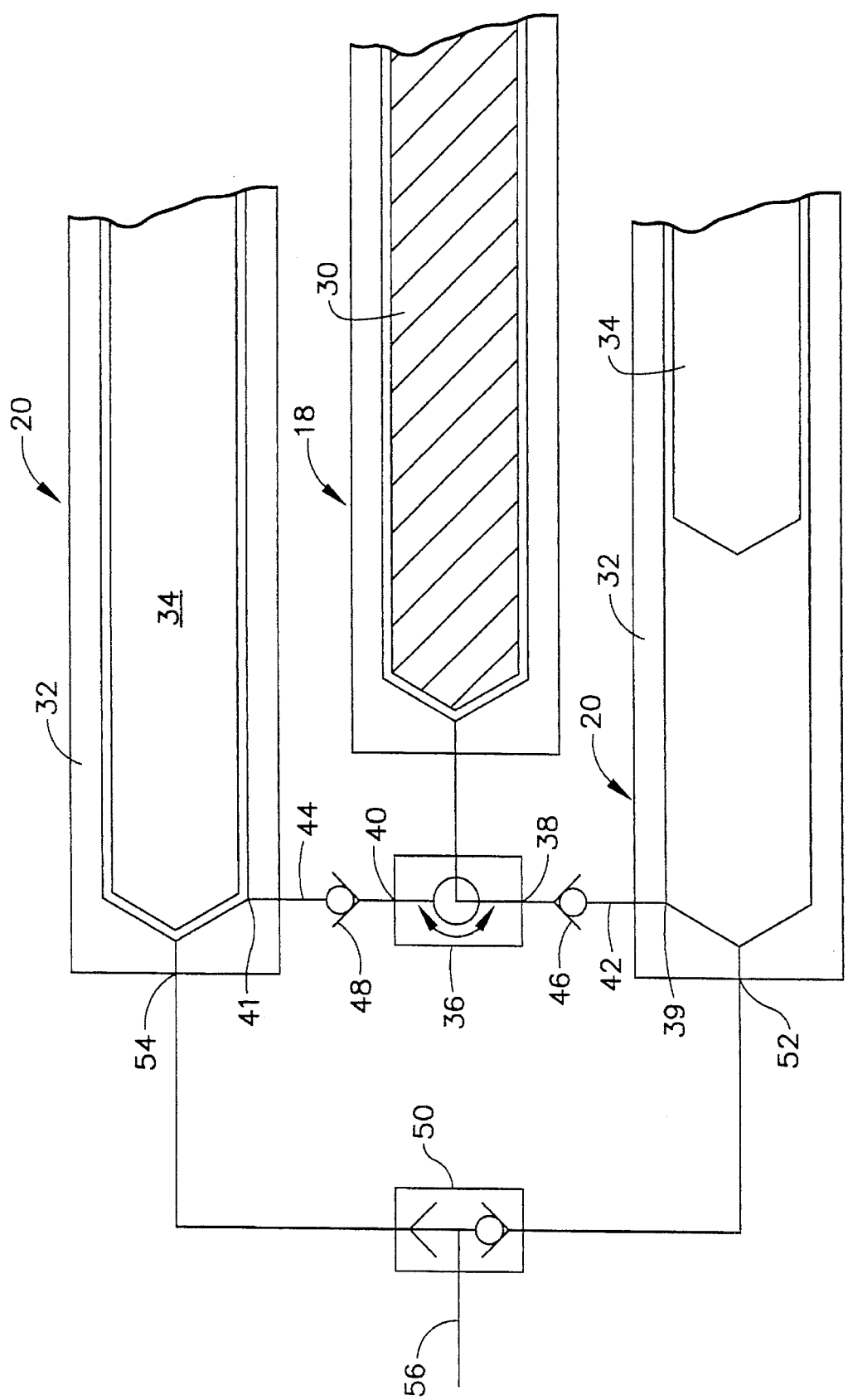
FIG. 3 is a diagrammatic top view illustrating the configuration of the extruder, accumulators and associated valving as taught by the present invention.

The components of the injection unit 14 are uniquely integrated to implement the present molding method. Specifically, the primary elements are an extruder 18, and two accumulators 20. The extruder 18 is intended for continuous plasticizing and, therefore, has a non-reciprocating feed screw 30 (see FIG. 3). Material is supplied to the extruder in any convenient manner, such as by a hopper 24. The rotational power for the screw 30 is also provided in a conventional manner, as by an electric motor 26 or other motive force, connected to a gearbox 28 that drives the screw 30. Since the movement of the screw 30 is rotational only, the drive system is greatly simplified over the injection units having a screw which must also reciprocate.

The accumulators 20 are preferably identical in construction since they are used alternately for the same functions as will be more fully described later. Accordingly, specific descriptions of the features, construction and capabilities apply equally to both accumulators 20. Each accumulator 20 is essentially a variable volume reservoir by virtue of a cylindrical barrel 32 and a hydraulically actuated piston 34 that moves linearly within the barrel 32. The relative size of the barrel 32 and piston 34, as well as the stroke of the piston 34, will vary according to the quantity of melt required to=fill the mold. In the constriction of melt accumulators, it is desirable to configure the end-shapes of the barrel 32 and piston 34 in a way that minimizes the amount of resin remaining in the barrel 32 when the piston 34 is fully extended, as will be more fully discussed later.

At the outlet of the extruder 18 is a rotary valve 36 having outlet ports 38 and 40 that connect to accumulators 20 and 22, via suitable conduits 42 and 44. At a suitable point between the outlets 38 and 40 of the valve 36 and the inlets 39 and 41 to the accumulators 20 and 22, ball check valves 46 and 48 are provided to control the direction of the flow through conduits 42 and 44. The check valves 46 and 48 prevent a pressure increase in the extruder 18 when one of the accumulators is activated to inject plastic and maintain pressure on the mold during pack and hold. The outlet of each accumulator is connected to a shuttle type (double-acting) ball check 50 that also serves as a junction for the outlets 52 and 54 of the accumulators 20 and 22, uniting the resin to flow to supply a single nozzle 56. The shuttle valve 50 prevents the material that is being injected into the mold by one accumulator from pressurizing the other accumulator and impeding the resin transfer from the extruder 18.

Figure 1:
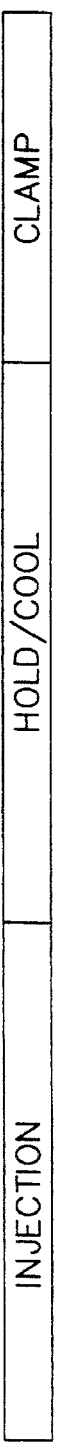
FIG. 1 is a bar chart illustrating the relative timing and sequence of the primary events in an injection molding cycle.
Figure 2A:
FIG. 2a is a bar chart illustrating the relative timing and sequence of injection/plasticizing functions as accomplished by the injection unit in a standard reciprocating screw injection molding machine.
Figure 2B:
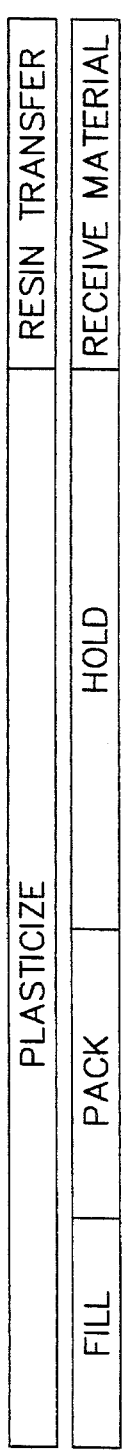
FIG. 2b is a bar chart illustrating the relative timing and sequence of injection/plasticizing functions in a reciprocating screw injection molding machine that includes a single accumulator; the upper bar shows the function of the injection unit, and the lower bar shows the functions of the accumulator.
Figure 2C:
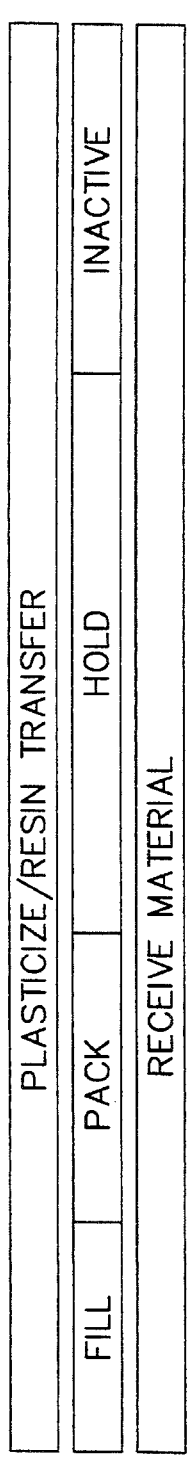
FIG. 2c is a bar chart illustrating the relative timing and sequence of injection/plasticizing functions in an injection molding machine that includes two accumulators and an extruder with a non-reciprocating screw, in accordance with the present invention; the upper bar shows the function of the extruder, the middle bar shows the injection accumulator, and the lower bar shows the shot-building accumulator.

A cycle of operation of the injection molding machine 10, incorporating the method of the present invention will now be described. Referring to FIG. 2c, and beginning at the point in time where the clamp unit 12 has just operated to close the mold that will receive the plastic melt, several things are happening concurrently: (1) the clamp 12 maintains pressure to hold the mold closed; (2) the injection accumulator 20 is operating to inject plastic melt into the mold; (3) the extruder 18 is plasticizing material into plastic melt; and (4) the rotary valve 36 is positioned to transfer the melted resin into the shot-building accumulator 20. While functions (1), (3), and (4) continue, the injection accumulator 20 initiates pack, then hold to maintain the proper pressure on the mold.

When the injection accumulator 20 reaches the "hold" portion of the cycle, it has emptied itself of material. More specifically, the injection of plastic melt is accomplished by applying sufficient force to move the piston 34 rapidly forward in the barrel 32. The melt is thus forced to flow through the outlet 52 of the injection accumulator 20, on through the shuttle valve 50 and nozzle 56, then into the mold. This approximate point in the cycle can be identified by the configuration shown in FIG. 3. The piston 34 in the shot-building (lower) accumulator 20 is retracted to provide room for the accumulated melt in the barrel. The piston 34 in the injection (upper) accumulator 20 is fully forward in the barrel 32, having completed the injection function.

As part of the injection process, it is highly desirable to avoid "dead" spots in the material flow path where plastic melt can remain stationary through repeated cycles, allowing it to degrade, possibly later mix with good material and be injected to form a poor quality part. Accordingly, a mating configuration between the end of the piston 34 and the outlet of the barrel 32 will minimize the amount of material remaining in the accumulator 20 after the shot is completed.

After sufficient hold/cool time, the pressure held by the injection accumulator is released, the clamp 12 operates to open the mold, eject the part(s), then re-close to begin a subsequent cycle. As noted earlier, simultaneously with the operation of the injection accumulator, the shot-building accumulator receives material from the continuously running extruder 18. Accordingly, the next molding cycle is identical except that the accumulators 20 switch functions; i.e., the rotary valve 36 shifts so that the accumulator that previously injected (and is empty) now receives material from the extruder 18, enabling the other accumulator that now has a full charge of melt to initiate the fill, pack and hold sequence.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims.

What is claimed is:

1. A method of optimizing cycle time and plasticizing time in an injection molding machine having a plasticizing and injection apparatus that includes an extruder with a non-reciprocating screw and two melt accumulators adapted to receive material and inject alternately into a single mold through a common nozzle, the method comprising:

(a) operating the extruder to plasticize material continuously and supply a constant flow of high quality plastic melt;

(b) directing the flow of plastic melt by means including a rotary valve, from the extruder to a first accumulator which functions as a shot-building accumulator;

(c) operating a second accumulator as an injection accumulator to fill and pack the mold with the plastic melt, and hold pressure on the material in the mold while the extruder is concurrently supplying plastic melt to the first accumulator;

(d) diverting the flow of plastic melt by means including a rotary valve, to the second accumulator after (i) the second accumulator has completed the injection function and (ii) the extruder has supplied a sufficient charge of plastic melt to the first accumulator, so that the second accumulator now functions as the shot-building accumulator;

(e) operating the first accumulator as the injection accumulator to fill and pack the mold with the plastic melt, and hold pressure on the material in the mold while the extruder is concurrently supplying plastic melt to the second accumulator; and (f) continuing to alternate injection and shot-building functions of the first and second melt accumulators in a manner to optimize the production capacity of the mold by matching the plasticizing rate of the extruder to the injection requirements of the mold.

2. The method according to claim 1 wherein steps (c) and (e) further include: providing a double-acting ball check valve to prevent pressurization of the shot-building accumulator by the injection accumulator.

* * * * *